United States Patent
Calatayud et al.

(10) Patent No.: US 12,077,291 B2
(45) Date of Patent: Sep. 3, 2024

(54) SYSTEM OF MORPHING CONTROL SURFACE FOR AIRCRAFT WING

(71) Applicant: Airbus Operations (S.A.S.), Toulouse (FR)

(72) Inventors: Cristobal Calatayud, Boulogne Billancourt (FR); Benjamin Trarieux, Toulouse (FR); Brice Albert, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/992,509

(22) Filed: Nov. 22, 2022

(65) Prior Publication Data

US 2023/0159153 A1    May 25, 2023

(30) Foreign Application Priority Data

Nov. 24, 2021   (FR) ........................................ 2112450

(51) Int. Cl.
*B64C 3/44*    (2006.01)
*B64C 3/26*    (2006.01)
*B64C 9/18*    (2006.01)

(52) U.S. Cl.
CPC .................. *B64C 3/44* (2013.01); *B64C 3/26* (2013.01); *B64C 9/18* (2013.01); *B64C 2003/445* (2013.01)

(58) Field of Classification Search
CPC ........ B64C 2003/445; B64C 3/52; B64C 3/48
See application file for complete search history.

(56) References Cited

U.S. PATENT DOCUMENTS

| | | | |
|---|---|---|---|
| 2006/0186269 A1* | 8/2006 | Kota ...................... | B63H 3/002 244/123.1 |
| 2010/0259046 A1* | 10/2010 | Kota ..................... | F03D 1/0641 416/223 R |
| 2013/0224024 A1 | 8/2013 | Chang et al. | |
| 2013/0256461 A1* | 10/2013 | Maenz ...................... | B64C 9/02 244/213 |
| 2019/0061910 A1* | 2/2019 | Kota ........................ | B64C 3/48 |
| 2019/0084665 A1 | 3/2019 | Bentivoglio et al. | |
| 2021/0139128 A1 | 5/2021 | Bastiaansen | |

OTHER PUBLICATIONS

French Search Report for Application No. 2112450 dated Jun. 9, 2022.

* cited by examiner

Primary Examiner — Philip J Bonzell
Assistant Examiner — Eric Acosta
(74) Attorney, Agent, or Firm — KDW Firm PLLC

(57) ABSTRACT

A system includes at least one upper flexible skin intended to be fixed in the extension of an upper plane of the wing, a lower flexible skin intended to be movable in the extension of a lower plane of the wing and fixed along a trailing edge of the control surface, an actuator for generating a displacement of the lower flexible skin with respect to the lower plane. The displacement causes a curvature of the first, upper flexible skin and a curvature of the second, lower flexible skin having a concavity oriented in a same direction. The control surface system makes it possible to reduce the quantity of energy supplied by the actuator.

9 Claims, 4 Drawing Sheets

SYSTEM OF MORPHING CONTROL SURFACE FOR AIRCRAFT WING

TECHNICAL FIELD

The disclosure herein relates to a morphing aircraft control surface.

BACKGROUND

Generally, an aircraft control surface, such as an aileron, is set in motion about an articulation axis using an actuator. This articulation axis corresponds also to an axis of attachment of the control surface to a wing of the aircraft. The control surface is rigid. The moving of such a control surface to a deflection angle associated with a desired lift coefficient entails a fairly great expenditure of energy from the actuator.

SUMMARY

An object of the disclosure herein is to remedy this drawback. For that, it relates to a morphing control surface system for an aircraft wing, the wing comprising an upper plane and a lower plane.

According to the disclosure herein, the control surface system comprises at least:
- an upper flexible skin intended to be fixed to the wing in the extension of the upper plane of the wing;
- a lower flexible skin intended to be movable in the extension of the lower plane of the wing via a plane-to-plane link, the lower flexible skin being fixed to the upper flexible skin along a trailing edge of the control surface;
- at least one actuator intended to generate a displacement of the lower flexible skin with respect to the lower plane of the wing, the displacement of the lower flexible skin causing a curvature of the upper flexible skin and a curvature of the lower flexible skin, the curvature of the upper flexible skin and the curvature of the lower flexible skin having a concavity oriented in a same direction.

Thus, by virtue of the deformation of the flexible skins by a curvature, the necessary deflection angle of the control surface system is less great than the necessary deflection angle of a rigid control surface system for a same lift coefficient. Thus, the quantity of energy to be supplied by the actuator is much less great than the quantity of energy to be supplied by the actuator of a rigid control surface system for a same lift coefficient.

Furthermore, the actuator or actuators comprise at least one actuator axis arranged to be displaced longitudinally between the upper flexible skin and the lower flexible skin, the actuator axis or axes comprising an end fixed to an inner surface of the lower flexible skin.

Furthermore, the actuator or actuators are fixed onto an inner surface of the lower plane of the wing.

According to a particular feature, the actuator axis or axes are configured to each slide through an aperture of a rear spar of the wing.

For example, the control surface system comprises at least one linear ball-type guide bushing configured to be mounted on the aperture or apertures through which the actuator axis or axes can slide.

Moreover, the control surface system further comprises at least one auxiliary axis parallel to the actuator axis or axes, the auxiliary axis or axes having a first end fixed to the rear spar and a free second end directed toward the trailing edge of the control surface system, the control surface system further comprising at least one auxiliary bushing fixed onto the inner surface of the lower flexible skin, the free second end being able to slide in the auxiliary bushing.

According to a particular feature, the control surface system further comprises an internal skeleton between the upper flexible skin and the lower flexible skin, the internal skeleton having a compressive and tensile strength on an axis substantially at right angles to the upper flexible skin or the lower flexible skin greater than a shear strength of the internal skeleton on an axis substantially parallel to the upper flexible skin or the second, lower flexible skin.

The disclosure herein relates also to an aircraft, in particular a transport airplane, comprising at least one control surface system, as described above, equipping each of its wings.

BRIEF DESCRIPTION OF THE DRAWINGS

The attached figures will give a good understanding of how the disclosure herein can be produced. In these figures, references that are identical denote similar elements.

DETAILED DESCRIPTION

Figure 1:
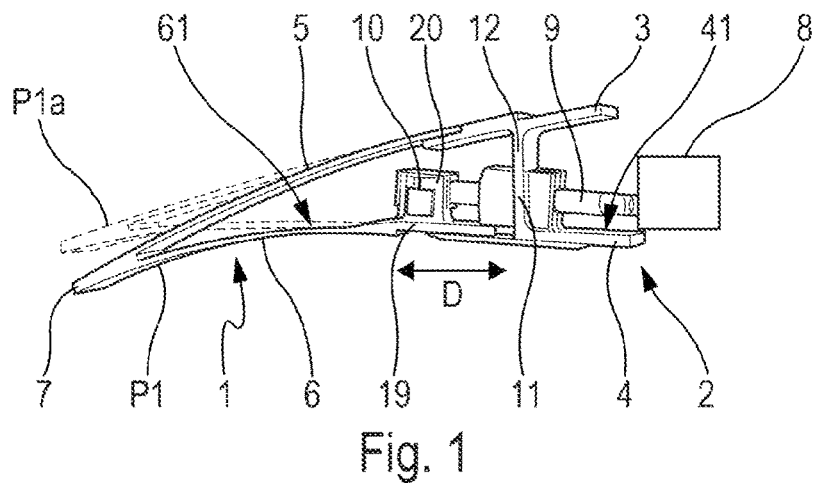
FIG. 1 represents a cross-sectional view of a control surface system according to two different positions.
Figure 10:
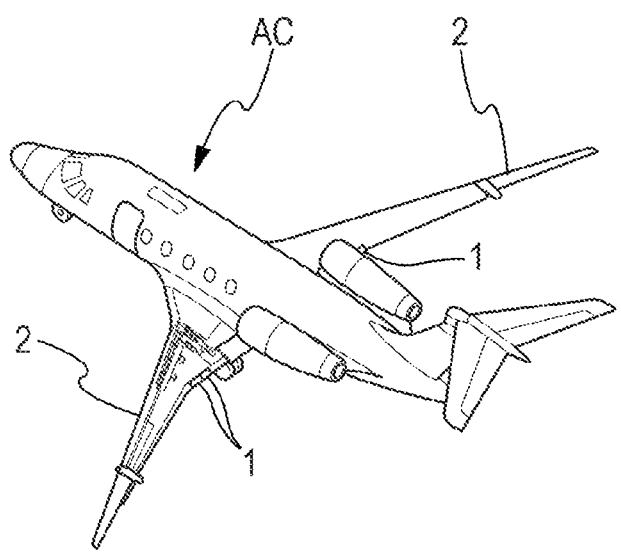
FIG. 10 represents a perspective view of an aircraft whose wings are equipped with control surface systems.

FIG. 1 represents the morphing control surface system 1 for a wing 2 of an aircraft AC (FIG. 10). The morphing control surface system 1 can correspond to a morphing aileron system.

A morphing control surface corresponds to a non-rigid control surface which can be deformed to change geometrical shape.

The wing 2, that the control surface system 2 is intended to equip, comprises an upper plane 3 and a lower plane 4.

The control surface system 1 comprises at least an upper flexible skin 5 and a lower flexible skin 6. The upper flexible skin 5 and the lower flexible skin 6 meet to form a trailing edge 7 of the control surface system 1. In a non-limiting manner, the flexible skins 5 and 6 can be manufactured in thermoplastic composite or in thermosetting composite.

The upper flexible skin 5 is intended to be fixed to the wing 2 in the extension of the upper plane 3 of the wing 2. As a nonlimiting example, the upper flexible skin 5 can be fixed to the upper plane 3 of the wing 2 using countersunk head screws.

The lower flexible skin 6 is intended to be movable in the extension of the lower plane 4 of the wing 2 via a plane-to-plane link between the lower plane 4 and the lower flexible skin 6. The lower flexible skin 6 is fixed to the upper flexible skin 5 along the trailing edge 7.

As a nonlimiting example, the lower flexible skin 6 is fixed to the upper flexible skin 5 along the trailing edge 7 by welding in the case where the upper 5 and lower 6 flexible skins are manufactured from thermoplastic composite. They can also be fixed together along the trailing edge 7 by cofiring in the case where they are manufactured from thermoplastic or thermosetting composite. They can also be fixed together along the trailing edge 7 by bonding or by rivets.

Figure 8:
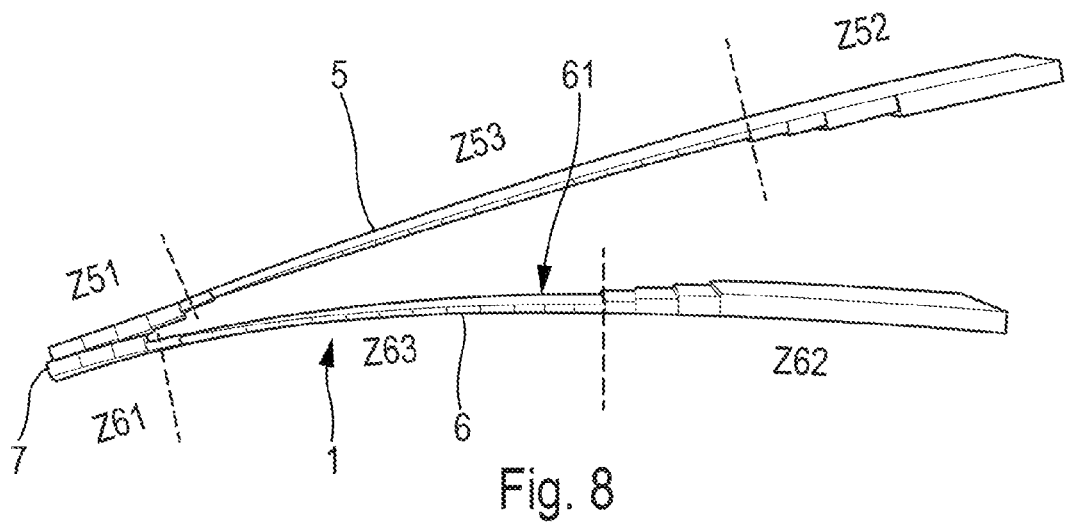
FIG. 8 represents a cross section of the two flexible skins highlighting the transverse change in their thickness.

Advantageously, as represented in FIG. 8, the upper flexible skin 5 has a greater thickness in a zone Z51 situated at the trailing edge 7 and in a zone Z52 situated at the fixing of the upper flexible skin 5 to the upper plane 3 of the wing 2 than in a central zone Z53 situated between the zone Z51 and the zone Z52. Likewise, the lower flexible skin 6 has a greater thickness in a zone Z61 situated at the trailing edge 7 and in a zone Z62 situated at the plane-to-plane link between the lower flexible skin 6 and the lower plane 4 of the wing 2 than in a central zone Z63 situated between the zone Z61 and the zone Z62.

The dotted lines in FIG. 8 designate the approximate limits of the different zones.

In a nonlimiting manner, the thickness ratio between the zone Z51 and the central zone Z53 is between 2 and 3. The thickness ratio between the zone Z52 and the central zone Z53 is between 4 and 5. As an example, the zone Z51 has a thickness of between 2.20 mm and 1.95 mm. The zone Z52 has a thickness of between 2.5 mm and 3 mm. The zone Z53 has a thickness of between 0.715 mm and 0.975 mm.

Likewise and in a nonlimiting manner, the thickness ratio between the zone Z61 and the central zone Z63 is between 2 and 3. The thickness ratio between the zone Z62 and the central zone Z63 is between 4 and 5. As an example, the zone Z61 has a thickness of between 2.20 mm and 1.95 mm. The zone Z62 has a thickness of between 2.5 mm and 3 mm. The zone Z63 has a thickness of between 0.715 mm and 0.975 mm.

These thickness ratios make it possible to control the form of curvature of the flexible skins 5 and 6.

According to one embodiment, the thickness between the zones Z51, Z52, Z53, Z61, Z62, Z63 can change continuously. According to another embodiment, the thickness between the zones Z51, Z52, Z53, Z61, Z62, Z63 can change in staircase fashion as represented in FIG. 8.

Figure 3:
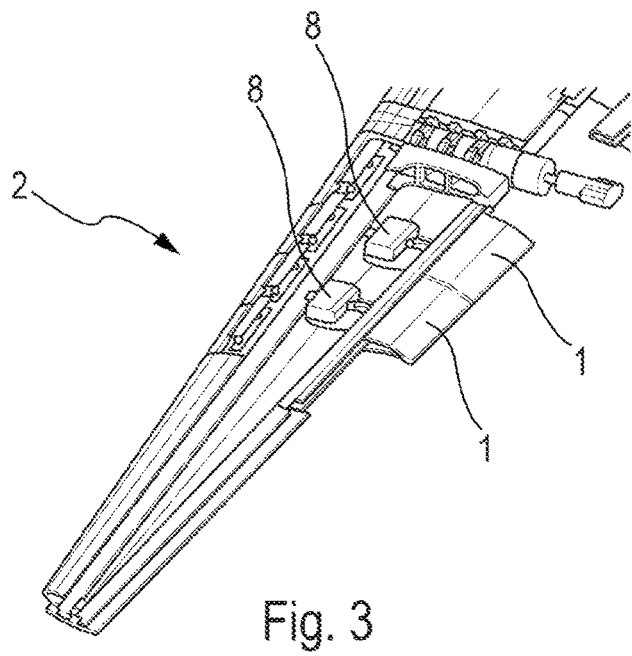
FIG. 3 represents a perspective view of an aircraft wing equipped with the morphing control surface system.
Figure 6:
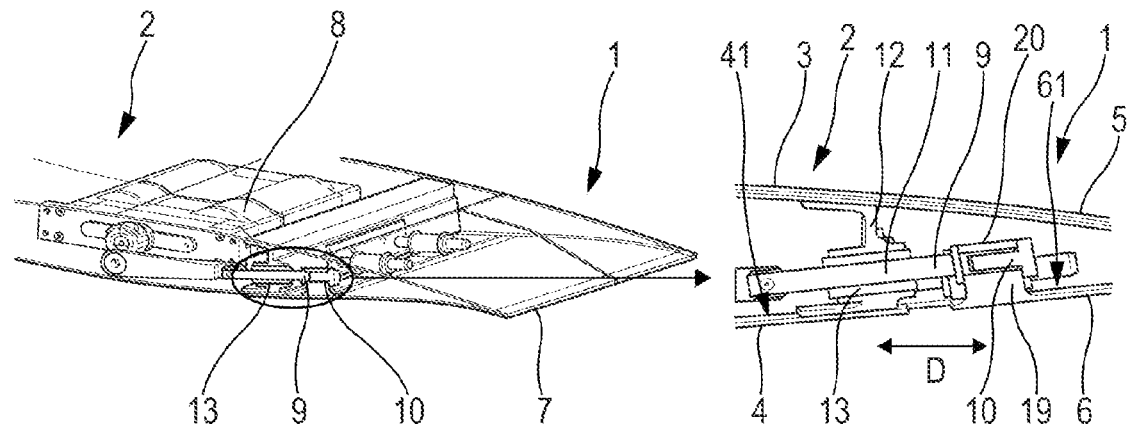
FIG. 6 represents, on the right, a view of a cross section along an actuator axis of a control surface system and, on the left, a detail of the cross section.
Figure 7:
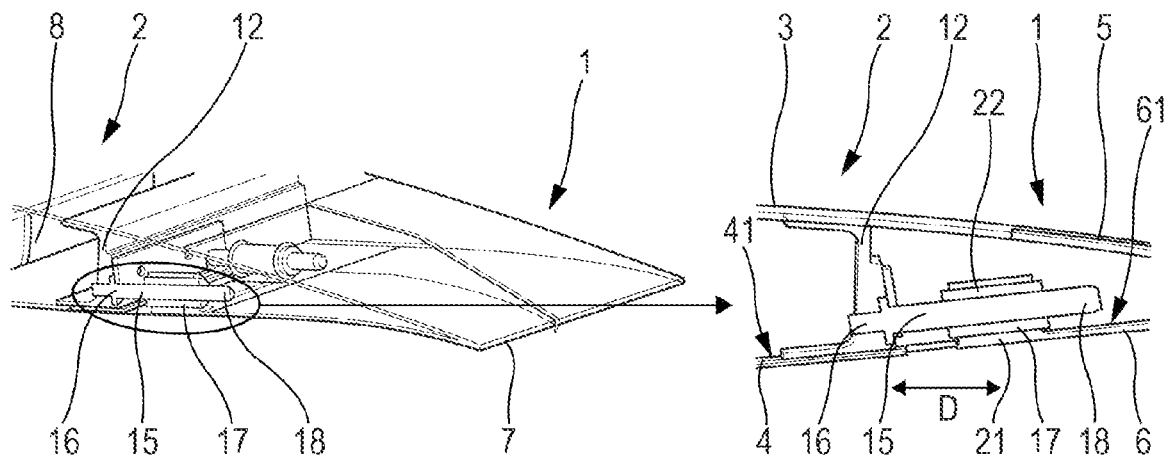
FIG. 7 represents, on the right, a view of a cross section along an auxiliary axis of a control surface system and, on the left, a detail of the cross section.

As represented in FIG. 3, the control surface system 1 further comprises at least one actuator 8 intended to generate a displacement D of the flexible skin 6 with respect to the lower plane 4 of the wing 2. In FIG. 1, FIG. 6 and FIG. 7, the displacement D generated by the actuator or actuators 8 is represented by a double-headed arrow.

The actuator or actuators 8 are configured to generate a linear displacement of the lower flexible skin 6 in two opposite directions. The direction of displacement D of the lower flexible skin 6 can be directed alternately toward the trailing edge 7 or directed away from the trailing edge 7.

Figure 2:
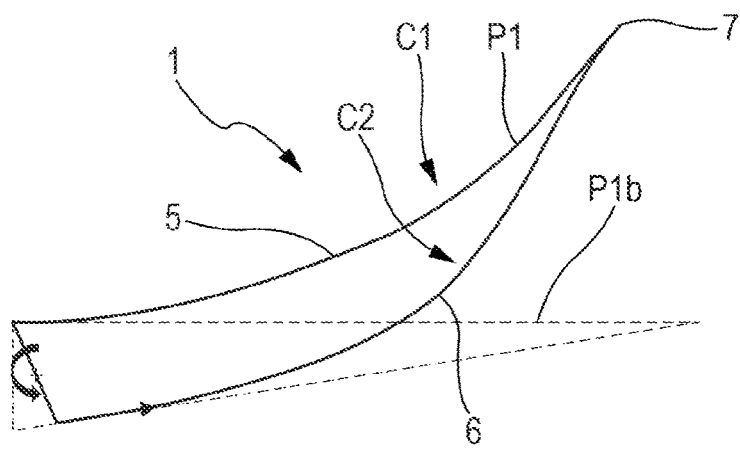
FIG. 2 represents a cross-sectional schematic view of a control surface system according to two different positions.

The displacement D of the lower flexible skin 6 causes a curvature of the upper flexible skin 5 and a curvature of the lower flexible skin 6. The curvature of the upper flexible skin 5 and the curvature of the lower flexible skin 6 have a concavity C1, C2 oriented in a same direction, as represented in FIG. 1 and FIG. 2. In FIG. 1, a position P1 and a second position P1*a* are represented. In FIG. 2, a position P1*b* in which the flexible skins 5 and 6 have a substantially nil curvature and a position P1 in which the flexible skins 5 and 6 have a non-nil curvature are represented. The direction of the concavity C1, C2 generated by a displacement D directed toward the trailing edge 7 is opposite to the direction of the concavity C1, C2 generated by a displacement D directed away from the trailing edge 7.

Figure 4:
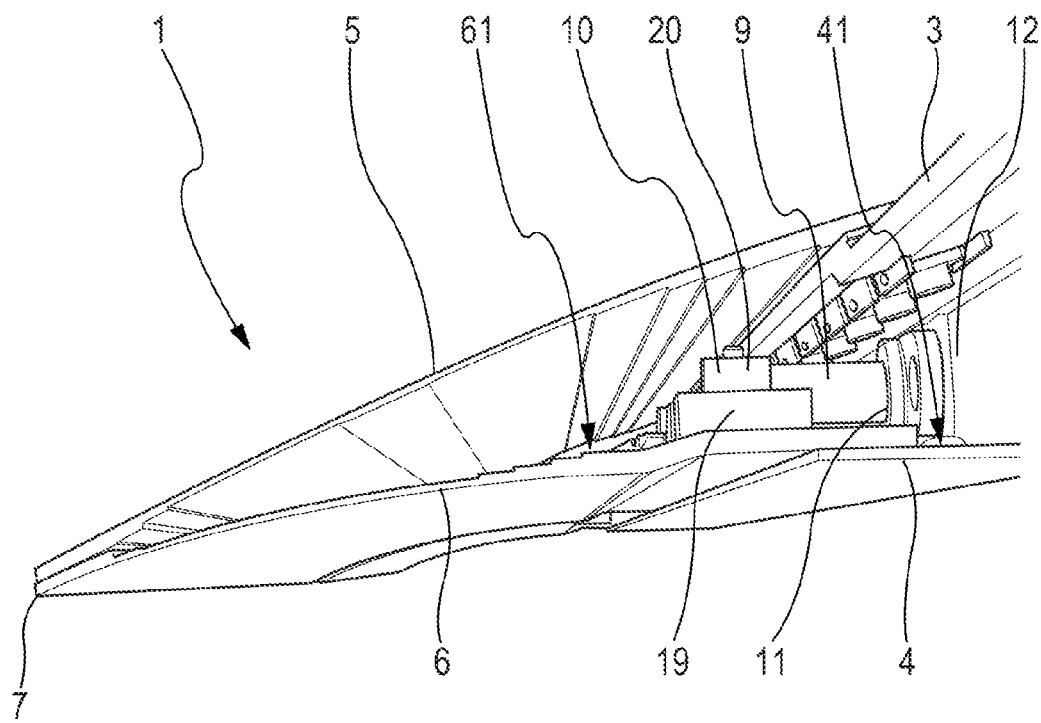
FIG. 4 represents a worm's-eye view of a cross section of a control surface system.
Figure 5:
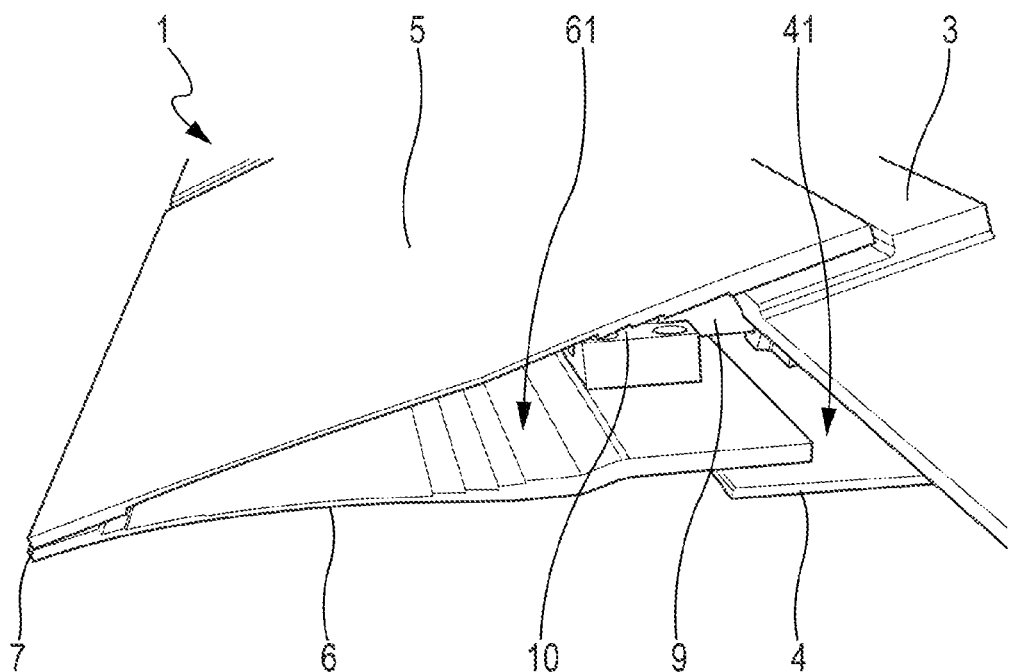
FIG. 5 represents a bird's-eye view of a cross section of a control surface system.

The actuator or actuators 8 comprise at least one actuator axis 9 arranged to be displaced longitudinally between the upper flexible skin 5 and the lower flexible skin 6. The actuator axis or axes 9 comprise an end 10 fixed to an inner surface 61 of the lower flexible skin 6. As represented in FIG. 4, FIG. 5 and FIG. 6, the end 10 can be fixed to the inner surface 61 of the lower flexible skin 6 via an axis support. The axis support can comprise a surface 19 fixed to the inner surface 61 of the lower flexible skin 6 and a flange 20 in which the end 10 is blocked or fixed (FIG. 1, FIG. 4 and FIG. 6). The inner surface 61 of the lower flexible skin 6 corresponds to a surface of the lower flexible skin 6 directed toward the upper flexible skin 5.

Advantageously, as represented in FIG. 6, the actuator or actuators 8 are fixed onto an inner surface 41 of the lower plane 4 of the wing 2. Thus, the actuator axis or axes 9 are displaced linearly with respect to the wing 2. The inner surface 41 of the lower plane 4 of the wing 2 corresponds to a surface of the lower plane 4 directed toward the upper plane 3 of the wing 2. Moreover, the actuator axis or axes 9 contribute to maintaining the plane-to-plane link between the lower flexible skin 6 and the lower plane 4.

Thus, when the actuator or actuators 8 are actuated, the actuator axis or axes 9 are displaced linearly on their respective longitudinal axes. Since the end 10 of the actuator axis or axes 9 is fixed to the lower flexible skin 6, the lower flexible skin 6 is driven by the actuator axis or axes 9. Since the lower flexible skin 6 is fixed to the upper flexible skin 5 along the trailing edge 7, the lower flexible skin 6 and the upper flexible skin 5 are deformed to form the curvature described above.

Between the upper plane 3 and the lower plane 4 of the wing 2, the wing 2 can comprise a rear spar 12 extending over the entire span of the wing 2. This rear spar 12 is situated as close as possible to the trailing edge of the wing 2.

The actuator axis or axes 9 can be configured to each slide through an aperture 11 of the rear spar 12 of the wing 2. The rear spar 12 can then serve as a guide for the actuator axis or axes 9.

The control surface system 1 can also comprise at least one linear ball-type guide bushing 13 configured to be mounted on the aperture or apertures 11 of the rear spar 12 through which the actuator axis or axes 9 can slide.

Advantageously, as represented in FIG. 7, the control surface system 1 can further comprise at least one auxiliary axis 15. The auxiliary axis or axes 15 are parallel to the actuator axis or axes 9. The auxiliary axis or axes 15 have an end 16 fixed to the rear spar 12 and a free end 18 directed toward the trailing edge 7 of the control surface system 1. The control surface system 1 further comprises at least one auxiliary bushing 17 fixed onto the inner surface 61 of the lower flexible skin 6. The free end 18 can slide in the auxiliary bushing 17. The auxiliary bushing or bushings 17 serve as guide for the auxiliary axis or axes 15. The auxiliary bushing or bushings can be fixed to the inner surface 61 using an axis support. The axis support can comprise a surface 21 fixed onto the inner surface 61 of the lower flexible skin 6 and a flange 22 on which the auxiliary bushing is mounted (FIG. 7). Thus, when the actuator or actuators 8 are actuated, the actuator axis or axes 9 drive the lower flexible skin 6. The driving of the lower flexible skin 6 makes it possible to generate a displacement of the lower flexible skin 6. The displacement of the lower flexible skin 6 drives the auxiliary bushing or bushings 17 which are then displaced about the auxiliary axis or axes 15. Moreover, the auxiliary axis or axes 15 contribute to maintaining the plane-to-plane link between the lower flexible skin 6 and the lower plane 4.

The actuator or actuators 8 and the auxiliary axes 15 have dimensions allowing them to be incorporated in a wing 2.

Furthermore, the morphing control surface system 1 makes it possible to reduce the necessary travel of the actuator axis 9 and the necessary load supplied by the actuator or actuators 8 with respect to the necessary travel and the necessary load of a rigid control surface system for a same lift coefficient.

Figure 9:
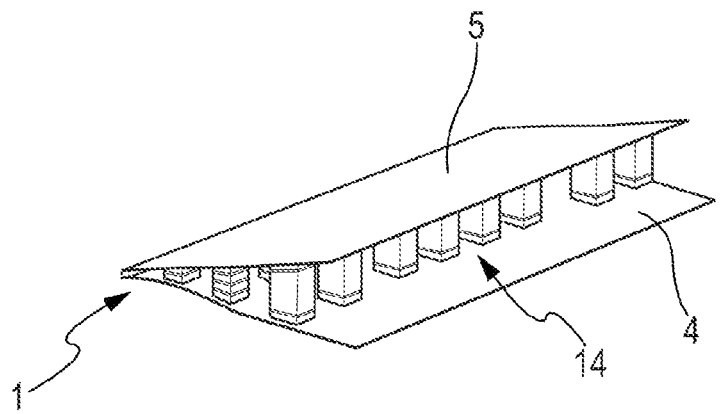
FIG. 9 represents a perspective view of an embodiment of the control surface system comprising an internal skeleton.

As represented in FIG. 9, the control surface system can further comprise an internal skeleton 14 between the upper flexible skin 5 and the lower flexible skin 6. The internal skeleton 14 has a compressive and tensile strength on an axis substantially at right angles to the upper flexible skin 5 or the lower flexible skin 6 greater than a shear strength of the internal skeleton 14 on an axis substantially parallel to the upper flexible skin 5 or the lower flexible skin 6.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A morphing control surface system for an aircraft wing, the wing comprising an upper plane and a lower plane, comprising:
   an upper flexible skin configured to be fixed to the wing in an extension of the upper plane of the wing;
   a lower flexible skin configured to be movable in an extension of the lower plane of the wing via a plane-to-plane link, the lower flexible skin being fixed to the upper flexible skin along a trailing edge of the control surface;
   at least one actuator configured to generate a displacement of the lower flexible skin with respect to the lower plane of the wing, and
   the displacement of the lower flexible skin configured to cause a curvature of the upper flexible skin and a curvature of the lower flexible skin, the curvature of the upper flexible skin and the curvature of the lower flexible skin having a concavity oriented in a same direction,
   wherein the upper flexible skin has a greater thickness in a zone situated at the trailing edge and in a zone situated at the fixing of the upper flexible skin to the upper plane of the wing than in a central zone situated between the zone situated at the trailing edge and the zone situated at the fixing; and
   wherein a thickness ratio between the zone situated at the trailing edge and the central zone is between 2 and 3, and a thickness ratio between the zone situated at the fixing and the central zone is between 4 and 5.

2. The morphing control surface system of claim 1, wherein the actuator or actuators comprise at least one actuator axis arranged to be displaced longitudinally between the upper flexible skin and the lower flexible skin, the actuator axis or axes comprising an end fixed to an inner surface of the lower flexible skin.

3. The morphing control surface system of claim 1, wherein the actuator or actuators are fixed onto an inner surface of the lower plane of the wing.

4. The morphing control surface system of claim 2, wherein the actuator axis or axes are configured to each slide through an aperture of a rear spar of the wing.

5. The morphing control surface system of claim 4, comprising at least one linear ball-type guide bushing configured to be mounted on the aperture or apertures through which the actuator axis or axes can slide.

6. The morphing control surface system of claim 2, comprising at least one auxiliary axis parallel to the actuator axis or axes, the auxiliary axis or axes having a first end fixed to the rear spar and a free second end directed toward the trailing edge of the control surface system, the control surface system comprising at least one auxiliary bushing fixed onto the inner surface of the lower flexible skin, the free second end being able to slide in the auxiliary bushing.

7. The morphing control surface system of claim 1, comprising an internal skeleton between the upper flexible skin and the lower flexible skin, the internal skeleton having a compressive and tensile strength on an axis substantially at right angles to the upper flexible skin or the lower flexible skin greater than a shear strength of the internal skeleton on an axis substantially parallel to the upper flexible skin or the lower flexible skin.

8. An aircraft, comprising at least one control surface system of claim 1 equipping each wing of the aircraft.

9. A morphing control surface system for an aircraft wing, the wing comprising an upper plane and a lower plane, comprising:
   an upper flexible skin configured to be fixed to the wing in an extension of the upper plane of the wing;
   a lower flexible skin configured to be movable in an extension of the lower plane of the wing via a plane-to-plane link, the lower flexible skin being fixed to the upper flexible skin along a trailing edge of the control surface;
   at least one actuator configured to generate a displacement of the lower flexible skin with respect to the lower plane of the wing, and
   the displacement of the lower flexible skin configured to cause a curvature of the upper flexible skin and a curvature of the lower flexible skin, the curvature of the upper flexible skin and the curvature of the lower flexible skin having a concavity oriented in a same direction;
   wherein the lower flexible skin has a greater thickness in a zone situated at the trailing edge and in a zone situated at the plane-to-plane link between the lower flexible skin and the lower plane of the wing than in a central zone situated between the zone situated at the trailing edge and the zone situated at the plane-to-plane link; and
   wherein a thickness ratio between the zone situated at the trailing edge and the central zone is between 2 and 3, and a thickness ratio between the zone situated at the plane-to-plane link and the central zone is between 4 and 5.

* * * * *